US006795655B1

(12) United States Patent
Sidorovich et al.

(10) Patent No.: US 6,795,655 B1
(45) Date of Patent: Sep. 21, 2004

(54) FREE-SPACE OPTICAL COMMUNICATION SYSTEM WITH SPATIAL MULTIPLEXING

(75) Inventors: Vladimir G. Sidorovich, Moscow (RU); Aleksei A. Leshev, St.-Petersburg (RU); Valery V. Ragulsky, Moscow (RU); Mikhail A. Sadovnikov, Moscow Region (RU); Mikhail V. Vasiliev, St.-Petersburg (RU); Vladimir P. Vasiliev, Moscow (RU)

(73) Assignee: Meklyn Enterprises Limited, Larnaca (CY)

(*) Notice: Subject to any disclaimer, the term of this patent is extended or adjusted under 35 U.S.C. 154(b) by 500 days.

(21) Appl. No.: 09/707,901

(22) Filed: Nov. 8, 2000

(30) Foreign Application Priority Data

Oct. 9, 2000 (RU) ...................................... 2000125190

(51) Int. Cl.[7] .............................................. H04B 10/00
(52) U.S. Cl. ....................................... 398/128; 398/118
(58) Field of Search ........................... 398/66, 118–131; 136/259

(56) References Cited

U.S. PATENT DOCUMENTS

| | | | |
|---|---|---|---|
| 3,713,163 A | 1/1973 | Keller et al. | |
| 4,063,083 A | * 12/1977 | Cathey et al. ............... | 398/164 |
| 4,170,400 A | 10/1979 | Bach et al. | |
| 4,354,742 A | * 10/1982 | Abel et al. ................... | 359/729 |
| 4,716,417 A | 12/1987 | Grumet | |
| 4,736,463 A | 4/1988 | Chavez | |
| 4,855,751 A | 8/1989 | Ingerson | |
| 4,935,630 A | 6/1990 | Merchant | |
| 4,960,315 A | 10/1990 | Kostal et al. | |
| 5,062,150 A | 10/1991 | Swanson et al. | |
| 5,148,322 A | 9/1992 | Aoyama et al. | |
| 5,218,356 A | 6/1993 | Knapp | |
| 5,345,336 A | 9/1994 | Aoyama et al. | |
| 5,589,968 A | 12/1996 | May | |
| 5,606,444 A | 2/1997 | Johnson et al. | |
| 5,610,750 A | 3/1997 | Popescu et al. | |
| 5,655,068 A | 8/1997 | Opoczynski | |
| 5,710,652 A | 1/1998 | Bloom et al. | |
| 5,745,941 A | 5/1998 | Miller, Sr. | |
| 5,777,768 A | 7/1998 | Korevaar | |
| 5,786,923 A | 7/1998 | Doucet et al. | |
| 5,870,216 A | 2/1999 | Brock et al. | |
| 5,909,296 A | 6/1999 | Tsacoyeanes | |
| 6,091,074 A | 7/2000 | Korevaar | |
| 6,104,513 A | * 8/2000 | Bloom ........................ | 398/117 |
| 6,118,131 A | 9/2000 | Korevaar | |
| 6,141,128 A | 10/2000 | Korevaar et al. | |
| 6,348,986 B1 | * 2/2002 | Doucet et al. .............. | 398/128 |

* cited by examiner

*Primary Examiner*—Jason Chan
*Assistant Examiner*—David Payne
(74) *Attorney, Agent, or Firm*—McDermott Will & Emery LLP

(57) ABSTRACT

A free-space optical communication system utilizes an optical repeater system, which is installed between transmitting terminals and receiving terminals. Each optical receiver of the repeater system connects via a separate optical beam with one or more of the transmitting terminals. Two or more optical transmitters of the repeater system preferably communicate with each of the receiving terminals. Modules of the repeater system are spatially separated far enough from each other to prevent cross-talk between information on the beams, either at the receivers of the repeating system or at the receiving terminals. Receiving elements in the repeater system and/or in the destination receiving system preferably convert angular beam separation into spatial resolution between beam detectors.

6 Claims, 6 Drawing Sheets

FREE-SPACE OPTICAL COMMUNICATION SYSTEM WITH SPATIAL MULTIPLEXING

FIELD OF THE INVENTION

The present invention relates to free-space optical communication systems and may be used for wireless/fiberless two-way information transfer between remote objects, including situations with many objects participating in point-to-point or point-to-multipoint information exchanges.

BACKGROUND

Through-out the developed and developing world, modem society continues to create exponentially increasing demands for digital information and the communication of such information between data devices. A variety of optical fiber and wired technologies now provide high bandwidth with attendant high data rates for communications to customer premises, but installation of such facilities is not practical in all locations. In many major population centers, installation of a new physical facility of this type requires underground installation with a high construction cost. The construction and the attendant requirement for local government approval impose considerable time delays. In many instances, the actual available capacity through long delayed deployments lags far behind the ever-increasing demand. Radio frequency (RF) wireless solutions reduce the time, complexity and cost of installation, but those solutions are inherently limited by their use of shared RF spectrum. As the number of users on a given piece of spectrum grows, the average capacity available to any one user declines.

Free-space optical communications systems offer two-way information transfer between remote objects without the use of wires and/or optical fibers. Because such systems can implement point-to-point links to the individual customer premises, such systems are not subject to the limits of shared capacity, as in the existing RF wireless technologies. Free-space optical communications systems may implement network (mesh) technologies for information transfer or point-to-multipoint technology for a two-way information exchange.

One known optical communication system uses two terminals, each which includes a transmitter in a form of a light source with modulation means, and a receiver (see U.S. Pat. No. 4,960,315). This known system is used as a backup, allowing restoration of communication upon disruption of a section of fiber optic connectivity. The disclosed system provides communication via an optical radiation beam propagating in free space. A drawback of the known system, however, is that its application is limited because it provides communication only via a single channel (one transmitter to one receiver) and hence has a low transmission capacity.

A known multi-channel optical communication system uses several transmitting devices implemented as lasers with modulation means, a transmitting medium implemented as an optical fiber transparent for the laser radiation, and several receiving devices (see U.S. Pat. No. 5,589,968). This system achieves an increase in transmission capacity due to spectral, time, and code multiplexing of channels. A drawback of this known system, however, is its limited application and high cost. This is because optical fiber is used as the optical radiation transmission medium. As noted, use of optical fiber requires expensive installation by laying optical cable, e.g. underground or on masts and typically requires government permissions and/or rights-of-way, which adds considerable further expenses.

A multi-channel free-space optical communication network is known based on use of a multi-address distributing device (router) comprising a scanner which can alternately point the light beam through the atmosphere at one or several receiving devices from a multitude of receiving devices, and a lens array where each lens provides collimation of the beam pointed at the corresponding to it receiving device or at several receiving devices (see U.S. Pat. No. 5,786,923). The known communication network may also use radiation of different wavelengths, wherein each wavelength is pointed at the corresponding receiving device by means of a dispersing optical device. Also, this known network may use spectral or time division of channels formed within the light beam dedicated to each of the receiving devices, in the same manner as when transmitting information via an optical fiber.

A drawback of the known free-space multi-channel system is that it does not provide for maximization of information transmission rate through the atmosphere. This drawback is critical, because the free-space channel providing information transmission through the atmosphere is, as a rule, the "bottleneck" in any communication network consisting of fiber optic and free-space (atmosphere) links.

The lower capacity of a free-space path in the atmosphere relative to a fiber optic path results from the presence of excessive noise arising from background light (primarily sunlight). Other factors that reduce capacity include the considerable losses of signal power. Substantial signal losses result from absorption and scattering in the atmosphere. Also, there are "geometrical losses" caused by widening of the light beam, during passage through the atmosphere, up to diameters exceeding the light receiving aperture size, i.e. so that substantial portions of the radiant energy are not directed on the intended receiver. To mitigate these drawbacks, the use of the free-space atmospheric channels requires additional methods of channel multiplexing (in comparison to fiber optic systems).

A free-space optical communication system, known from the Description to the Japanese patent application No. 06303198, Oct. 10, 1994, includes some multiplexing. The known system comprises several light-emitting elements and several optical receivers, operating simultaneously. The system is intended to achieve higher bit rate by information transfer through the atmosphere from the simultaneous use of several receivers and transmitters to create several spatially-divided information transmission channels (with number of channels equal to the number of receivers and corresponding number of transmitters interconnected with optical beams).

The known free-space optical communication system with spatial mutliplexing, however, suffers from several disadvantages. First, the system has limited application and complex design when the number of channels is large, because the maximum achievable number of channels in this system is equal to the number of transmitters or the number of corresponding receivers. Also, to separate the channels, it is necessary for each receiver to receive only the transmitter signal intended for or addressed to this receiver, which makes the system exceedingly complex. To provide division of channels, each transmitter should have a lens forming a narrow optical beam, and the receivers should be placed far enough from each other to avoid overlapping of optical beams from different transmitters, caused by the beam divergence. This, in turn, causes an increased size of each optical communication device, if the number of channels is large. This also limits the communication distance, because each lens is forming optical beams of non-zero divergence, and the transverse dimensions of each beam, starting from some particular distance, will increase proportionally to the distance from the transmitter.

Thus, the known free-space optical communication system is inconvenient for creating of a large number of independent communication channels, which in turn limits the ability to increase the system capacity for servicing a large number of subscribers with large data-rate demands.

The known system also suffers from the drawbacks common for prior art free-space optical systems: a) requirement for clear line-of-site between communicating terminals; b) lack of flexibility in transmission capacity available to terminals with changing demand for bandwidth. Hence, there is a continuing need for a free-space optical communication system with increased capacity, providing flexible connectivity between multiple terminals not necessarily having line-of-site with all other terminals,—without requiring overly complex optical elements or other system components. To the extent that the system relies on multiplexing, any such system should implement the multiplexing in as simple and effective manner as possible.

SUMMARY OF THE INVENTION

The optical communication device and system, which are the subjects of this application, are intended to simplify the system design for a given number of communication channels. The system also is intended to provide an increase in transmission rate and the number of communication channels while retaining a relatively simple design and acceptable size. In addition, the system provides increased reliability of communication and allows connecting terminals that do not have a direct line-of-site therebetween. The system also allows a change in the number of channels connecting the transmitters and receivers in accordance with variable demand for the rate of information transfer to and from the various subscribers.

To achieve these results, the inventive system utilizes a repeater system with multiple receivers and transmitters servicing terminals or other nodes of the free-space communication network. The repeater system's transmitters and receivers are arranged in groups, so as to form several spatially divided optical receiver modules and spatially divided optical transmitter modules. The repeater system is installed between a transmitting node having several optical transmitters and a receiving terminal with several optical receivers. Each multi-beam optical receiver module of the repeater system connects via a separate optical beam with one of the transmitting terminal transmitters. Each multi-beam optical transmitter module of the repeater system connects with one of the receiving terminal receivers via a spatially separate beam. The repeater system components are spatially separated far enough from each other to prevent optical radiation of the beams connecting: a) different transmitters of the transmitting terminal with the receivers of different repeaters, and b) the transmitters of different repeaters with different receivers of the receiving terminal, —from entering the receivers not designated for this radiation.

The communication channels between the receiver modules and the transmitter modules of the repeater system may provide transmission, amplification, and, if necessary, processing of the received signal before transmitting to the receiving terminal receiver. The channels preferably are reconfigurable, for example, via selective links though one or more switches or routers.

One distinguishing feature of the invention is positioning of a repeater system between the communicating terminals, where the repeater system includes several receiver modules and several transmitter modules spatially separated far enough from each other to prevent optical radiation of the optical beams connecting the transmitters and receivers of the repeater modules and the network nodes or terminals from entering the receivers not designated for this radiation. This feature makes the transmitting and the receiving terminals with multiple transmitters and receivers compact and eliminates the need for placing the transmitters and the receivers far from each other to avoid overlapping of the optical beams.

The division of radiation emission of transmitters pointed at different spatially separated receiver modules of the repeater system is achieved due to angular separation of such beams. Each beam emitted by the transmitting terminal is pointed at the corresponding repeater receiver module and enters only this receiver module, thus providing a spatial division of channels created by these beams.

The beams directed from different transmitter modules of the repeater system towards one receiving terminal enter the terminal at different angles due to the spatial separation of the transmitter modules. This arrangement provides an angular form of spatial division. In particular, the repeater system transmitter modules are sufficiently separated from each other such that the arrival or incidence angles of the beams for one terminal allow for use of simple optical elements in the terminal to direct the beams separately to different optical receivers of the terminal, without their overlapping on such user terminal receivers. At the same time, the distances between the receivers of the receiving terminal in this system are not of any significance, which allows for use of a relatively compact design for the user terminal.

The angular selectivity of the receivers in the terminal nodes and/or in the modules of the repeater system, described above may be implemented, for example, by means of their arrangement in the vicinity of the focal surface of the receiving objective (lens). The beams entering the objective's receiving aperture at different angles, are focused in different areas of the focal surface of the receiving objective (lens). Coupling the photodetectors of the receivers to locations in the vicinity of such focal areas, corresponding to different beams, provides a separate reception of these beams by the elements of the receivers.

The system also provides an increase of the maximum communication range. This results from the amplification of information-carrying signals in the repeater system, as well as from reduced signal scintillation caused by turbulence of the atmosphere at the shorter distances between the transmitting terminal and the repeater system, and between the repeater system and the receiving terminal, compared to the overall distance between the transmitting and the receiving terminals.

Another distinguishing feature of the invention relates to the use of multi-beam repeater transceiver modules, each equipped with several receivers having angular selectivity and thus able to separately receive the light beams entering the module at different angles, and each equipped with several transmitters arranged to output radiation beams at different angles. This makes it possible to have several transmitting terminals and several receiving terminals. One of several transmitters of each transmitting terminal is connected via a separate optical beam with one of the receivers of each of several of the repeater modules. One of the transmitters of two or more transmitter modules of the repeater system is connected via a separate optical beam with one of the receivers of the receiving terminal. A separate reception of beams from different transmitting terminals by different receivers of the repeater system is provided due to the angular selectivity of the repeater module receivers, as well as due to the fact that beams from different transmitting terminals are entering the repeater modules at different angles. Implementation of separate reception of beams from different transmitting terminals requires separation of such terminals in space sufficient for the repeater system receivers with angular selectivity to resolve signals arriving from different nodes or terminals.

Another distinction is that the repeater system may be equipped with routing or switching networks, which make it possible to connect each of the repeater module receivers with each of the repeater module transmitters. This allows the system operator to change the number of the beams connecting different transmitting and receiving terminals, to meet the demand for information transmission rate between particular terminals. This also provides higher reliability of the system as the beams blocked by obstacles may be replaced with the ones having clear paths.

The inventive system may provide dual exchange of information between two or more terminals or other types of nodes, each equipped with the transmitters and the receivers. To achieve this, the repeater system would include two or more modules equipped with receivers and transmitters, i.e. to form transceiver modules. An additional advantage of such a structure is that, one repeater system module may provide dual exchange of information between any two or more nodes. In some cases, information received via one beam at a transceiver module may be retransmitted from the same module on a different beam, i.e., going to a destination node or terminal. This creates the additional flexibility to allow the system to connect multiple terminals separated by an obstacle blocking the lines-of-site between the terminals.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The essence of the devices, which are the subject of this application, is explained by the examples of its implementation as well as by the drawings discussed below. In the various figures, like reference numerals refer to the same or similar elements.

DETAILED DESCRIPTION OF EMBODIMENTS

The invention utilizes an optical repeater system with modules at substantially separate locations, to implement spatial division of free-space optical communications between a transmitting node or terminal and a receiving node or terminal. The repeaters may incorporate amplification and/or communication elements for routing or switching, so that the repeater system may function as a communication hub.

Figure 1:
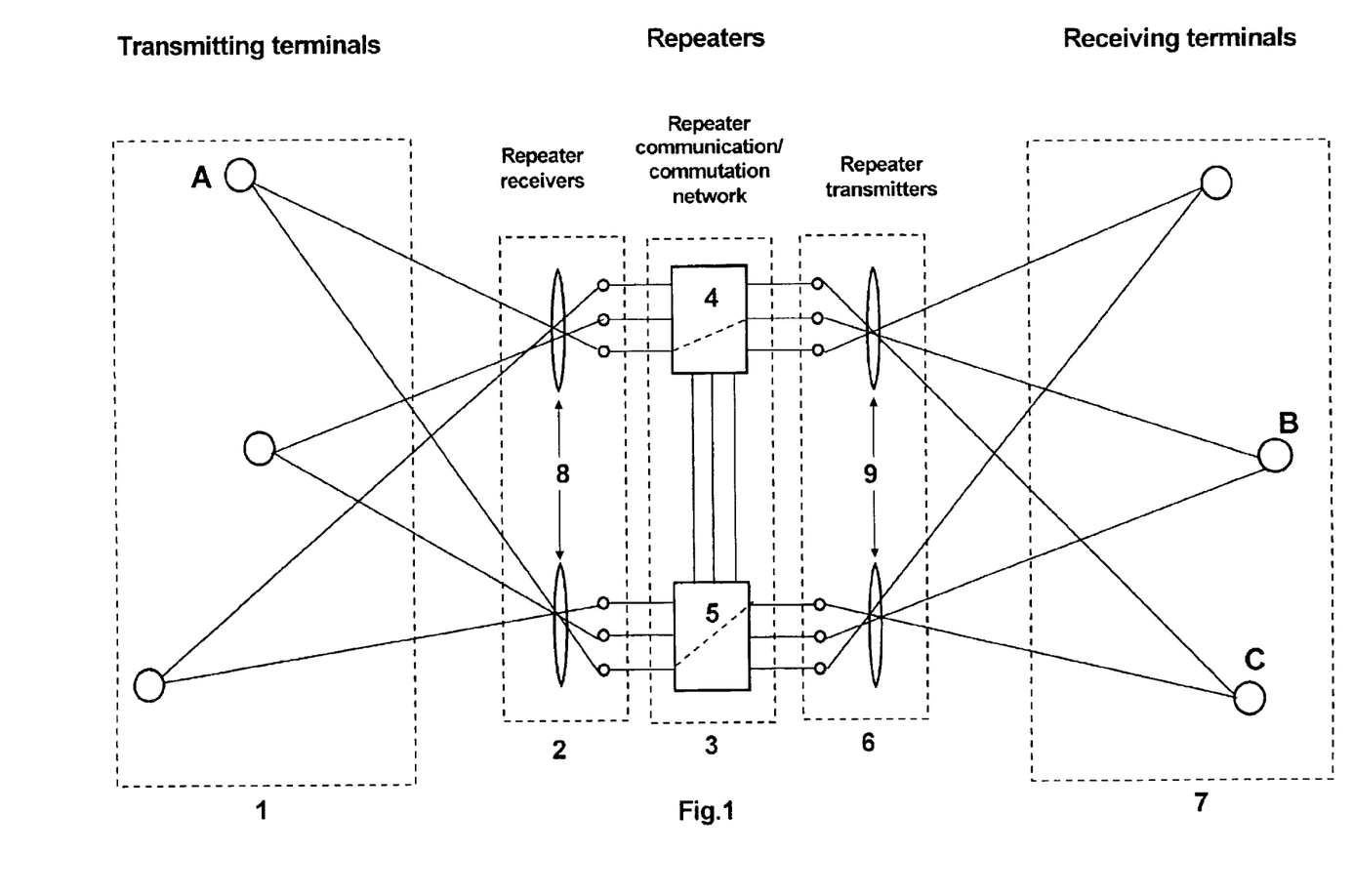
FIG. 1 is a functional diagram of the elements of a free-space optical communication system providing spatial multiplexing using angular selectivity, in accord with the invention.

The system block diagram of FIG. 1 shows a simple example of an implementation of an optical communication system, which embodies the concepts of the present invention The drawing shows several transmitting terminals 1 emitting optical beams directed towards each of several receivers 2 of the optical repeater system. The repeater receivers 2 are placed near the focal areas of the lenses 8. Transmitting terminals are separated in space far enough to prevent overlapping of beams emitted by them in the focal areas of the lenses 8. Hence, the repeater receivers 2 separately receive the beams from different transmitting terminals 1.

In this implementation, the system also includes a form of communication or commutation network 3 between the receivers and transmitters forming the repeater system. This network 3, within the repeater system, is equipped with switches (commutators) 4 and 5. Any known switch or routing technology may be used to provide the desired signal connection between any of the repeater receivers 2 and any of the repeater transmitters 6. The switches 4 and 5 also provide amplification of signals by known methods, and may provide signal processing (e. g. noise filtering). The switches also may be connected to a telecommunication network that would provide alternative connectivity between the terminals as well as between the terminals and other terminals that are not connected via free-space optical links. The repeater system transmitters 6 are placed near the focal areas of lenses 9, so as to allow the formation of collimated beams directed towards the corresponding receiving terminals 7.

One lens 8 and the associated set of receivers 2 form a receiver module. One set of transmitters and the associated lens 9 form a transmitter module. In preferred embodiments discussed more later, the repeater system actually utilizes optical elements and associated transmitters and repeaters that together form transceiver modules.

In the general sense, the transmitting terminals 1 and the receiving terminals 7 may be considered as optical communications nodes of the overall free-space optical communication system. In the preferred embodiments, these optical communication nodes provide two-way optical communication, and as such, are actually transceiver nodes.

The drawing shows the transmitting terminals and the receiving terminals 7 on opposite sides of the repeater system, for convenience of illustration only. In actual practice, the repeater system may service originating and terminating nodes that may lie in virtually any direction or on any "side" of the physical structure of the repeater system.

One of the major purposes of the invention is to create several separated light beams connecting any transmitting terminal with any receiving terminal without increasing the size of the terminals. Separation of the beams emitted by different transmitters is achieved by spatial separation of the repeater modules rather than of the transmitters. This inventive approach becomes particularly valuable if there are several terminals in place that may be made very compact at the cost of placing the repeater modules (transmitter modules or receiver modules) far enough apart for the beams to be spatially resolved by the optical systems of the destination terminals.

At the same time there may be situations where connectivity between one terminal on one side of the picture and two terminals on the other side is required. This is provided by relevant connections in the switches 4 and 5 incorporated into the repeater network 3. In the drawing, in the boxes presenting the switches, the dotted lines symbolically show connections between receivers 2 and the transmitters 6 of the repeater system. For the case presented as the example, the transmitting terminal A is connected with the terminal B by one communication channel, and with the terminal C by another channel. Changing the order of connections between the repeater system receivers 2 and transmitters 6 via switches 4 and 5, one can, for example, provide connection between the A and B terminals by two separate communication channels, if a demand arises to increase the rate of information transmission between these terminals.

Figure 2A:
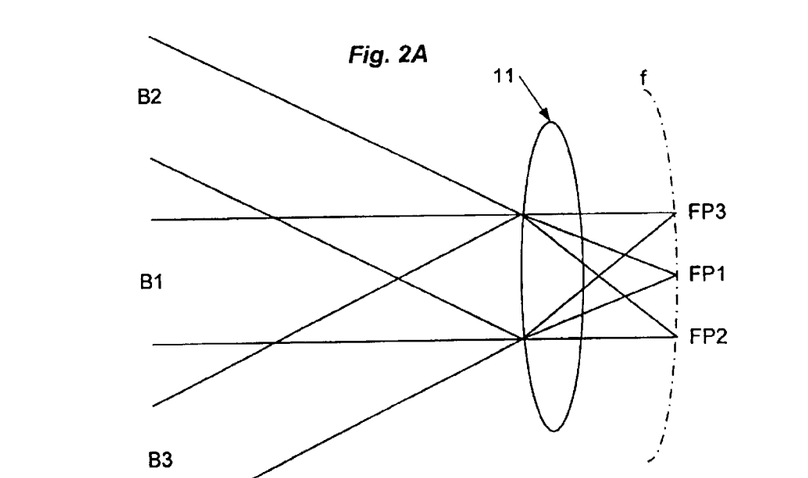
FIG. 2A is simplified optical-schematic showing operation of angular selectivity.

A significant aspect of the system of FIG. 1 is its reliance on angular separation, where-ever practical, to allow a receiver to receive and distinguish multiple separate beams carrying different information streams. To understand the operation of a receiving optic, to facilitate the processing based on angular separation, it may be helpful to consider the simplified schematic diagram of FIG. 2A. In the example, a lens 11 receives three beams B1, B2 and B3 at different angles. The lens 11 has a curvature such that it focuses light along a surface f. At a substantially axial angle of incidence, the lens 11 focuses the first beam B1 at a central point FP1 on the surface f. The lens 11 focuses the beam B2 at a point FP2, to one side of the axis; and the lens 11 focuses the beam B3 at a point FP3, to a point on the opposite side of the axis. In a receiver application, this means that the lens 11 can focus the beams arriving at different angles to different points on the focal plain f, which can coincide with different receivers. The photodetector elements of the receivers, in turn, convert the separate beams to separate electrical signals for further processing to recover the separate information carried by each respective beam. To achieve the required non-overlapping of the different beams on the same receiver requires that the point-spread functions of the lens corresponding to the different beams do not significantly overlap in the focal area of the lens. In other words, the sources of the beams shall be separated far enough so that the lens optically resolves the beams to adequately separated points on the focal plane.

Figure 2B:
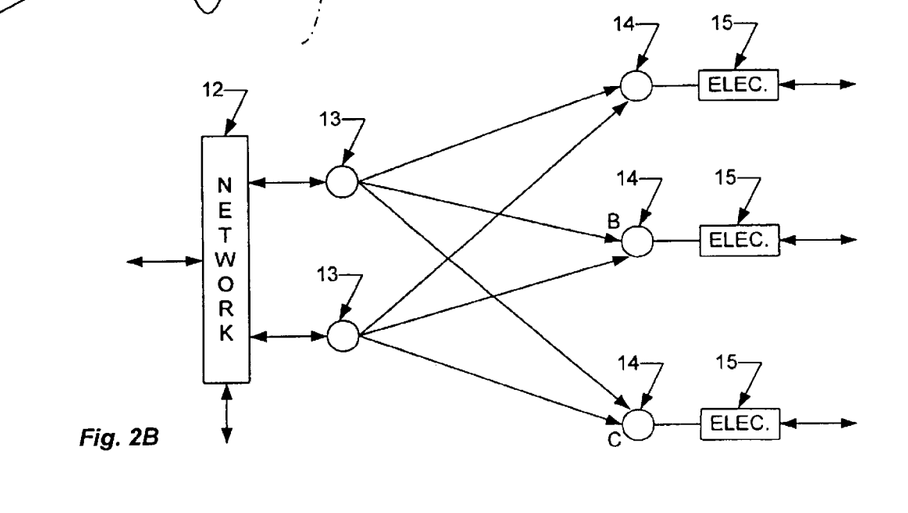
FIG. 2B is a somewhat more detailed block diagram of a portion of the system of FIG. 1, useful in explaining the application of angular selectivity to that part of the system.

FIG. 2B is a somewhat more detailed view of a portion of the system of FIG. 1, useful in explaining the application of angular selectivity. Angular selectivity may be utilized at any terminal, transceiver module, or node of the network that receives multiple beams. In the example of FIG. 2B, a network 12 in the repeater system provides two-way links from other transceiver modules (not shown) to two optical transceiver modules 13, for sending and receiving optical beams. These optical transceivers 13 would correspond to the repeater transmitters 6 with associated lenses 9 in FIG. 1 but would incorporate two-way communication capabilities similar to those of the receivers 2 and lenses 8.

The transceivers 13 provide multi-beam optical communications to and from a number of remote terminals having optical modules 14 coupled to appropriate transmit and receive electronics 15. Although the communications are duplex, for purposes of discussing angular selectivity, we will concentrate on the transmissions downstream from the repeater transceivers 13.

The system utilizes a plurality of beams, transmitted to each of the receiving terminal transceivers 14, to provide an aggregate transport of increased capacity via the free-space optical communication. For a user terminal example, one receiving station 14–15 might aggregate information from up to n optical beams where n is the number of transceivers 13. The drawing shows each optical module 14 receiving two beams from two transceivers.

To enable independent reception of the different beams at one receiving station, the beams are transmitted from spatially separated optical transmitting modules 13. The receiving terminal 14 distinguishes the beams spatially, using angular selectivity of the receiver optics and associated photo-sensors, in the manner described above relative to FIG. 2A. Information is separately demodulated from the received beams and combined to form an aggregate higher rate data stream, as desired. The simplified drawing shows a system version with a number N=2 of the multi-beam transmitting devices 13 associated with the repeater system, and a number M=3 of the multi-beam receiving devices 14.

In the example, each repeater transceiver 13 transmits one beam over-the-air to the optical module 14 of each receiving terminal. The disparate locations of the transmitting modules 13 creates spatial and angular separation between the beams at each of the receiving terminals 14. The optics selectively apply each of the two received beams to separate photodetectors, as discussed above. If the spatial/angular separation is not sufficient to eliminate cross-talk interference between information carried on the received beams and/or beams intended for other terminal modules 14, then the beams may vary as to other distinguishable parameters, such as subcarrier frequency, carrier frequency (wavelength), coding, modulation type, etc.

In this manner, each terminal 14–15 receives two optical beams carrying information intended for the associated equipment or network. Since the beams from the various transmitting modules 13 are distinguishable at each receiving optic 14, the receiving terminal 14–15 can recover the separate information from each beam. The electronics 15 at each station will typically include a multiplexer (not separately shown), to combine the information recovered from the beams to form an aggregate stream for communication to the end user equipment.

Different optical resolution may be required for optical systems installed at different terminals and repeater modules. In the example of FIG. 1, the most common situation probably will be that the nodes 1 are very significantly separated in space from each other; and the and user terminals 7 are very significantly separated in space from each other, for example installed on different buildings. At the same time, the transceivers of the repeater system may need to be located relatively close to each other to allow their compact placement on the top of a building or in adjacent windows of the same building. This means that the requirements relating to optical resolution and field-of-view of lenses used at the network nodes 1 and the user terminals 7 and in the repeater system modules may at times be significantly different.

In some cases, the lenses shall have a very wide field of view (up to ±120 degrees in vertical and horizontal planes) and relatively low requirements for spatial resolution (as low as 20–30 m at the distances up to 1000–1500 m). At the same time, other lens installations may require a relatively narrow field of view (several degrees in vertical and horizontal planes), however, such installation typically require a reasonably high resolution (20–25 cm at the distances of 1000–1500 m).

Concentric lenses, particularly spherical lenses, ideally suit requirements for optics with a wide-angle field of view and low resolution. For example, a spherical lens with a diameter of around 100–150 mm made of Heavy Flint type of glass may be used for installations having such requirements. This type of lens resolves 10 . 15 m at the distances of 1000–1500 m and has a field-of-view limited only by its mechanical mounting that may shadow the light arriving from some of the directions. A specific embodiment of such an optical transceiver module is discussed below with regard to FIGS. 3 and 4.

For narrow field of view terminal installations, a simple and cheap receiving telescope with an aperture of around 80–100 mm and a focal length of around 250–350 mm may be used. The terminal transmit telescope may be implemented with the same parameters or may consist of array of several, one per the repeater, small lenses (20–30 mm in diameter and with 50–70 mm focal length). An alternate narrow-angle embodiment is discussed in detail later, with regard to FIG. 5.

The mentioned above optics are inexpensive and do not require sophisticated manufacturing technology. At the same time, a system using such optics may provide creation of tens of wireless optical channels connecting each node or terminal on one side of the repeater system with each node or terminal on the other side. Use of the repeater system having the receivers and the transmitters installed in each of them allows establishing of multiple optical links between any two terminals or nodes on one side from the repeater system.

For example, as many as 9 repeater modules separated by 50 cm from each other may be positioned in a two-dimensional array of 100×100 cm size providing 9 spatially separated free-space optical channels between any two terminals. Such structure is inexpensive and compact and increases transmission rates between the nodes or terminals by nine times, e.g. up to 5–10 Gbit/s, provided that one channel has 0.6–0.2 Gbits/s transmission rate. Such rates make the system suitable for connecting nodes in metropolitan optical networks. Besides that, the spatial division beam communication technique increases reliability of communication as light beams output from any node or terminal may circumvent obstacles taking the route from to the repeater system and then to another node or terminal, instead of a direct route that may otherwise be blocked or too long.

Figure 3:
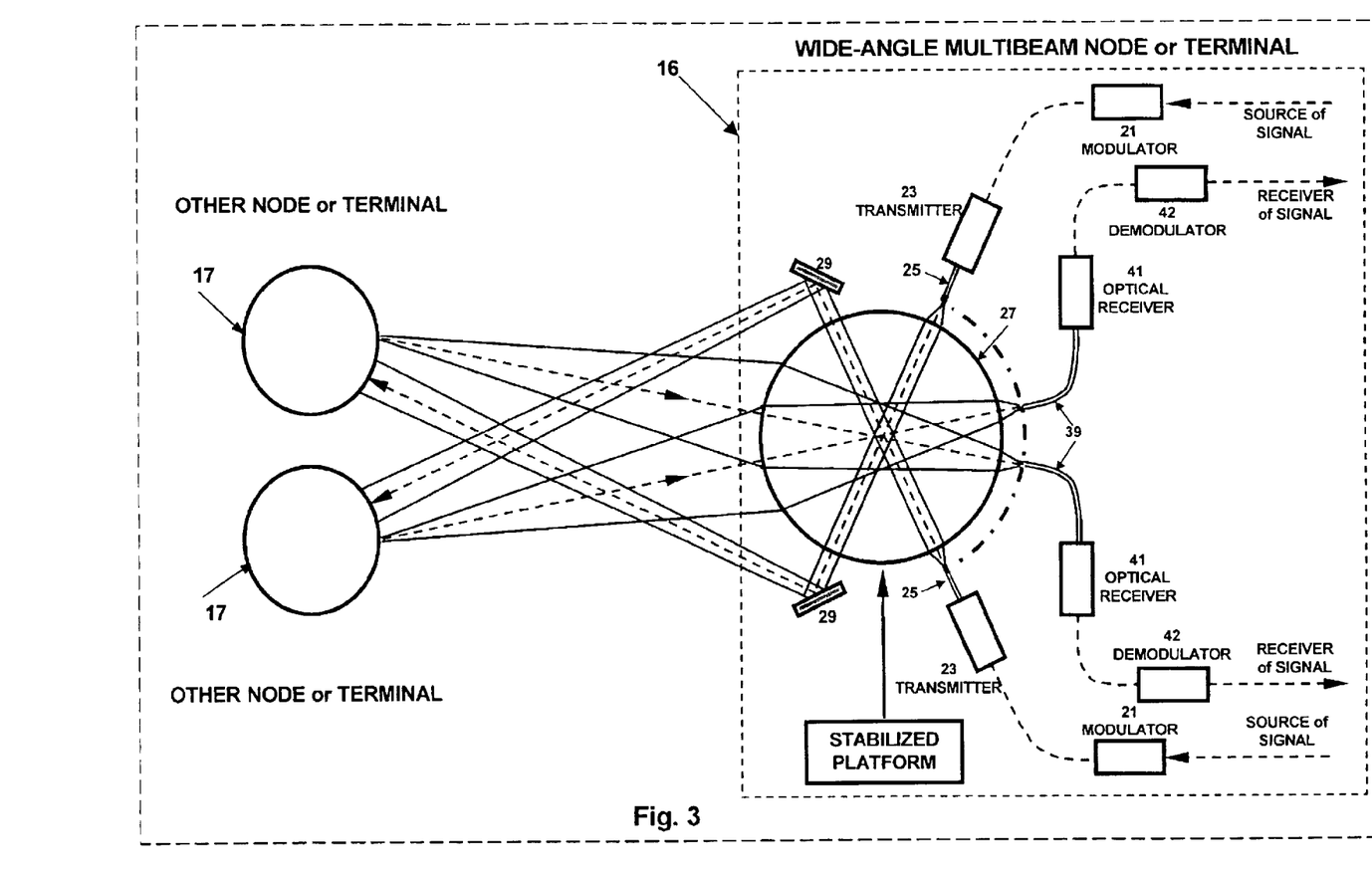
FIG. 3 is a functional block diagram of a multi-beam module communicating with a plurality of remote nodes or terminals or with transceiver modules of the repeater system, for use in the system of FIG. 1, under circumstances requiring a wide-angle of view.

FIG. 3 provides a schematic diagram of a multi-beam duplex optical communications terminal, node or module 16 of a preferred embodiment. This embodiment uses a shared spherical objective lens 27. In a system providing two-way communication, the illustrated terminal or module 16 of FIG. 3 may serve as one of the transmitting terminals 1 in the system of FIG. 1. The illustrated module 16 also may serve as a multi-beam receiver module (2 and 8) and/or as a multi-beam transmitter module (6 and 9) of the repeater system. In some cases, the module may serve as transceiver of one of the receiving terminals 7.

The illustrated embodiment is particularly advantageous where it communicates with other nodes or terminals in such an arrangement that requires a wide-angle field of view and relatively low optical resolution, for reasons outlined above. A narrow-angle higher resolution is discussed more later, with regard to FIG. 5. The system implementation of station 16 of FIG. 3 offers the capability of wireless (optical) data transmission from the multi-beam station 16 to several other nodes or terminals 17, with data rates of approximately 500–600 Mbit/s over each downlink channel and 250–300 Mbit/s over each uplink channel.

A distinctive feature of the preferred versions of the optical system implementation of FIG. 3 is the use of a single (for all users) wide-angle objective lens 27, shaped as a sphere, as a means to form narrow output optical beams targeted at remote user terminals. The same lens 27 is also used to concentrate radiation from all transceivers communicating with the station 16. This type of optical module design makes it least expensive and most compact, although other concentric lens designs may be used.

For each remote node or terminal 17 served by the station 16, a modulator 21 receives a signal for communication from a source. In a network or transmitting terminal 1, the source might be a wide area or public data network. In a receiving terminal 7, the source might be a local network of the user or an actual end user data device, such as a host computer or server. If used as one of the transceivers at 2 or 6 in the repeater system, the source would be another one of the transceiver modules 16, for example interconnected via a communication line or a selective link through the switch network 3, or the receiver of the same module 16.

Emission of the radiation source (transmit laser 23) of the station 16 is intensity-modulated in time in accordance with the electric signal coming from the information source and represents a sequence of rectangular pulses. The transmit laser 23 sends the modulated beam through an optical fiber pigtail 25 coupled to the spherical lens 27. Preferably, the emitting end of the pigtail 25 is mounted on a curved surface 28 in an area at or near the focal surface of the lens 27. The position of the light-emitting exit end of the optical fiber pigtail 25 is controlled, both laterally and longitudinally, using an electromagnetic or electromechanical mounting system (not shown).

Having gone through the wide-angle objective lens 27, the optical radiation from the laser 23 is transmitted as a thin beam (15–20 millimeters in diameter) with low divergence. It is directed onto a remote node or terminal 17 located at a distance from the station 16 by means of a swivel exit mirror 29.

The remote node or terminal 17 may be at a distance up to 2 km from the station 16, however, for many networks utilizing the repeater system, the distance will range up to 500 meters. The base station transmit laser 23 may be a laser diode emitting on a wavelength of 785 nm, or the system may use 1550-nm lasers.

A remote node or terminal includes an optical receiver and an optical transmitter, which may be implemented as elements of a module similar to the station 16. An alternative implementation is discussed later.

Due to the original design of the optical module of the station 16, emissions coming from remote nodes or terminals 16 are received via the same spherical objective lens 27 used for shaping laser emissions transmitted from the station 16. Emissions received from distant transmitters of the nodes or terminals 17 are concentrated in the vicinity of the focal surface of the spherical lens 27 in areas optically conjugated with the respective remote devices 17. This configuration of energy conveyance enables data reception other devices located randomly within the maximum angle allowed by the spherical objective lens 27.

Ends of 0.5–1 mm-thick light guides 39 channel the emissions to receivers 41. The position of the light-receiving entry end of each optical fiber pigtail 39 on the curved surface 28 is controlled laterally and longitudinally using an electromagnetic or electromechanical mounting system (not shown).

For each beam received by the objective lens 27, a point-spread function of the spherical lens 27 consists of a relatively narrow kernel that may be captured by a respective entry end of the optical waveguide 39 and wide "wings" spread over the focal surface. The wings in the point-spread function do not cause significant cross-talk between channels assigned to the terminals, because optical rays belonging to such wings approach the focal surface at angles exceeding the numerical aperture of the waveguides 39. Consequently, the guides 39 can not capture the rays from wings of point-spread functions related to adjacent remote terminals.

Demodulators 42 process the received signals and supply data to upstream elements, for example to a local area network or to a computer system of a user, to a wide area or public data network, or to a communication link to another transceiver 16 within the repeater system. Particularly in the repeater system application, some of the transmitters 23 may actually radiate transmit-beams carrying information previously received by receivers 41 within the same transceiver module 16.

In practice, angular drifts are possible of the optical module's support surfaces caused by sways of the building holding the station 16 and of the support-and-swivel mechanism. Therefore, it is preferable to implement methods of collective (for all users) angular stabilization of beams originating from the base station optical transceiver module. Creation of such a stabilization system is proposed. Passive building vibration isolation systems will also be used.

Figure 4:
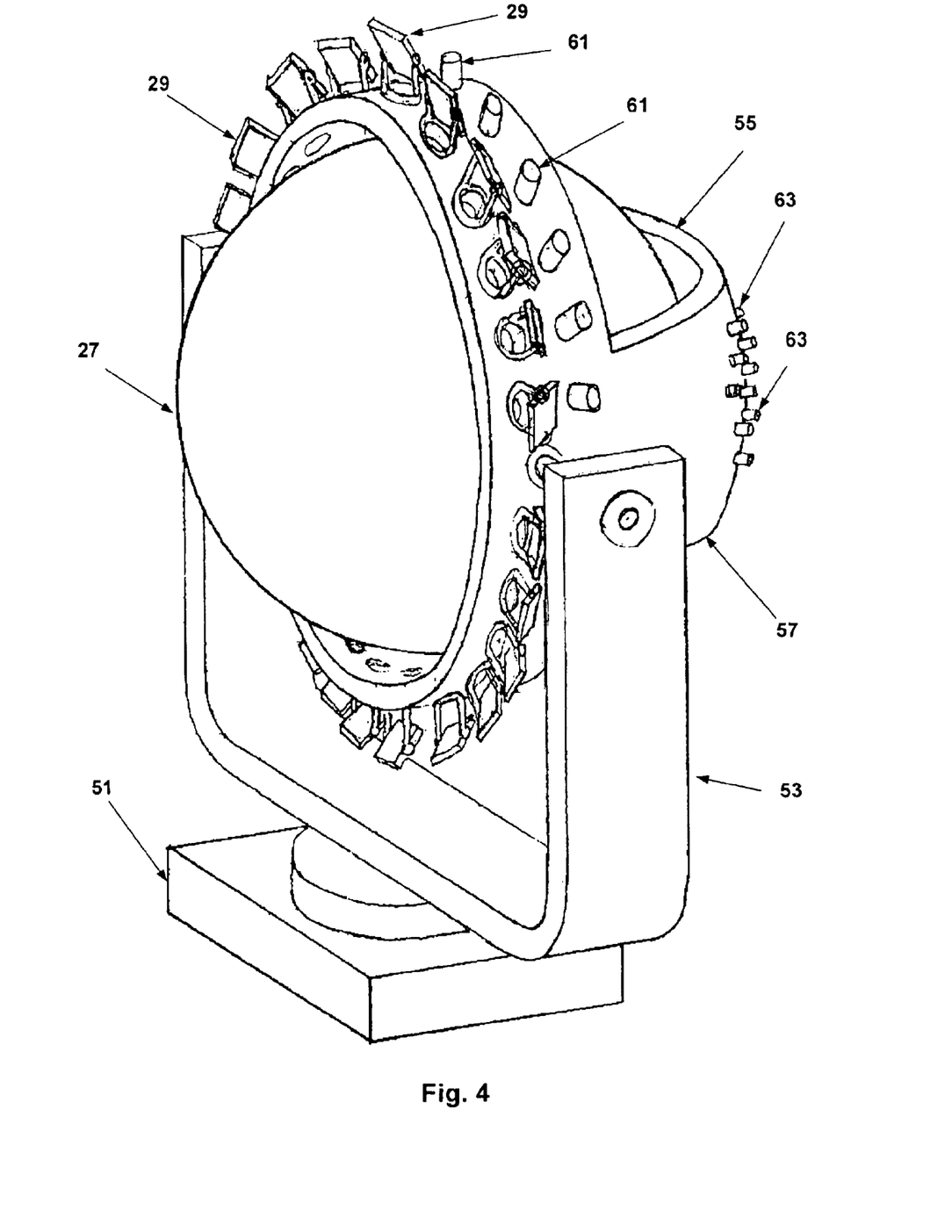
FIG. 4 is an isometric view of the optical system components of a preferred implementation of the multi-beam module of FIG. 3.

The drawing on FIG. 4 illustrates the spherical lens 27 inserted into a mount providing for its rotation around the center. The mount comprises a base 54 providing vertically rotatable support for a U-shaped stand 53. The stand, in turn, provides horizontally rotational support for a curved mounting surface member 55, for example by hinge bearings 57.

Folding mirrors 29 are installed adjacent to the lens 27 and look like sunflower petals. Cylinders behind the petals show mounts 61 into which exit ends of the fibers delivering radiation from radiation sources shall be inserted. Each mount 61 preferably is equipped with an electromagnetic or electromechanical system providing for two-dimensional movement of the optical fiber exit end along the focal surface of the lens. Each mount 61 may also include an electromechanical system enabling adjustment in the longitudinal (beam axis) direction. Alternatively, one electromechanical system may be used for both types of position adjustment.

Cylinders 63 behind the back surface of the lens mount member 55 show the mounts where entry ends of the fibers delivering radiation to photodetectors shall be inserted. Each such mount 63 is equipped with electromagnetic or an electromechanical device providing for two-dimensional movement of the fibers' entry ends along the focal surface of the lens and in the longitudinal direction, as discussed above relative to the fibers used for the downlink beams.

Pointing the transmit beam onto a remote device is done in two steps. During the first step, rough pointing (with an accuracy of ~0.5–1°) is conducted by swiveling the mirror (see FIG. 5). Final pointing (with an accuracy of ~0.5') is executed by means of two adjustment wedges (not shown).

Mechanical instability relative to individual remote devices may be mitigated by independent tracking of each remote device 17 by the optical beams of the station 16 assigned to the respective remote device 17. Such tracking, for example, may involve control of the electronic and/or electromechanical mounting system for the respective pigtail 25. For a transmit beam, for example, lateral adjustment allows a change of direction of each collimated beam formed by the spherical lens 27, so that each beam hits exactly the remote station 17 to which it has been assigned. An axial or longitudinal adjustment provides for optimization of each beam's diameter at the remote device 17.

In the receive direction, the entry end of each fiber 39 may be moved collectively with the spherical lens 29, to provide for compensation of instabilities of a building accommodating the station 17. Individual tracking is performed the same way as for the transmit operation via moving the entry end of each fiber 39 along the focal surface using one of the mounting structures.

The use of optical fibers provides for relatively dense packing of the signals in the regions adjacent and coupled to the objective lens 27. The much larger electronic components, such as the lasers 23 and the photodetectors 41, can be mounted at somewhat remote locations, where there is more space, and in some cases, where there is little or no exposure to the elements. In the case of the receiving operations, the light receiving ends of the optical fiber pigtails 39 present a relatively small, angular-specific aperture to the incoming light. Light impacting near the end of the fiber 39 does not reach the associated photodetector 41. Also, stray light from within the system 16 that impacts the end of the fiber at an angle greater than the angle of transmisivity of the fiber will not be guided to the photodetector 41.

Figure 5:
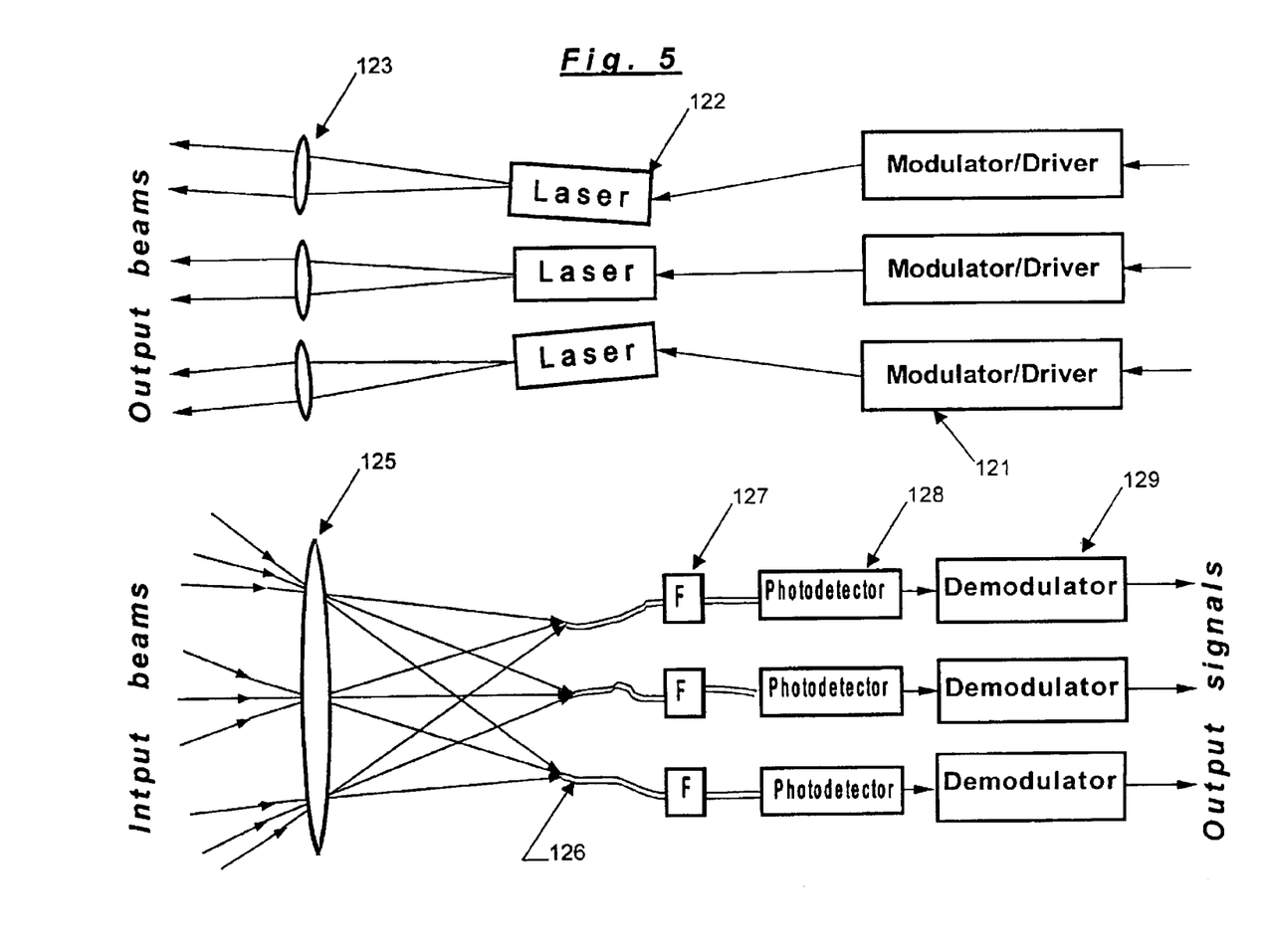
FIG. 5 is a functional block diagram of an alternate transceiver, for use in the system of FIG. 1, under circumstances requiring a narrow-angle of view.

FIG. 5 illustrates one preferred embodiment of the optics for a narrow-angle application. Such a system may be used in a network node or as a transceiver of the repeater system, however, this arrangement will most often be used in remote terminals serving end-user equipment.

Assume for discussion purposes, that the illustrated example relates to a remote terminal installation. A receiving lens 125 focuses input beams from the repeater transceiver modules in the vicinity of its focal surface. Light guides 126 have entry ends positioned in the areas where optical radiation from the repeater transceivers is focused by the lens 125. The light guides 126 have optical interference filters 127 incorporated into them. The optical interference filters 127 are transparent only to radiation from the repeater system and thereby filter out background light (mostly sunlight). The light guides 126 transport optical radiation from areas optically conjugated with the repeater transceivers relative to the lens 125 to sensitive areas of photodetectors 128. The photodetectors 128 convert light into electric signals, which in turn are applied to demodulators 129 to recover the information carried by the electric signals output from the photodetectors. The recovered information passes to other elements of the system or to users.

The terminal's transmitting optics comprise lasers 122 and several small size lenses 123. The emitting areas of the transmit lasers 122 are installed in areas optically conjugated to the repeater transceivers relative to the lenses 123. Optical radiation from lasers 122 is modulated by modulators/drivers 121 with information from the associated sources (not shown).

It should be noted that in this narrow-angle embodiment, the spatial separation of the images of the repeater transceivers in the focal surface of the lens 125 is very small. If for example, the repeaters are located at a distance of 50 cm from each other, the distance from the repeater transceiver modules to the terminal is 500 m, and the focal length of the lens 125 is 30 cm, the separation between the images is 0.3 mm.

As noted in the discussion of the earlier embodiment, the use of optical fibers to receive the focused light images facilitates dense packing, and in this case, allows receipt of the optical beam images at very closely spaced points on or about the focal surface of the lens 125. Entry ends of light guides with diameters of 0.1 mm may be located in the focal surface at the distances from each other equal to 0.30 mm. The light guides with smaller diameters or lenses with larger focal lengths may be used if the repeater transceivers are separated by 50 cm are located at the distances from the terminals larger than 500 m.

Output optics of the terminal comprises several small lenses each one of them assigned to collimate optical radiation intended for one of the repeater modules. Transmit lasers are located in the vicinity of central focal points of the lenses, and the lasers are inserted into mounts (not shown) that may provide for changing the distance between the lasers and the lenses to optimize optical diameters of the beams at the repeater transceiver modules.

Figure 6:
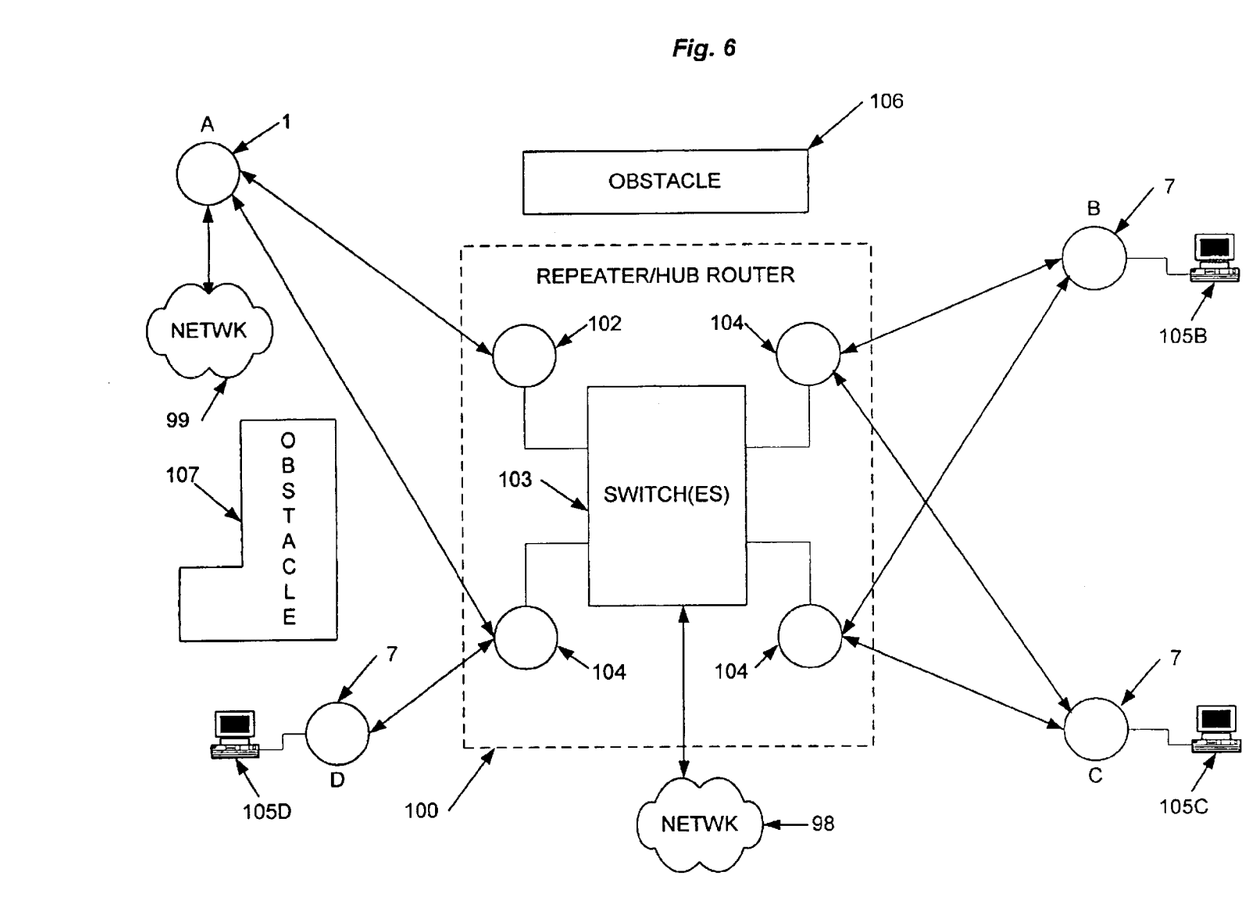
FIG. 6 is a modified block diagram of the system of FIG. 1 useful in explaining further advantageous operations thereof.

FIG. 6 is a functional block diagram of a two-way free-space communication system implemented in accord with the concepts of the present invention. In the example, node A is a network transmitting terminal A, similar to that in FIG. 1, except here it provides two-way data communication, for example to and from a network. The network may be a wide area network, however, it is expected that in many applications, the network 99 will provide communication access to and from the public Internet.

In the example, the optical transceiver at node 1 transmits and receives information for multiple customers. The optical transceiver at node 1 communicates through free-space, via information-carrying beams, communicated to and from the transceivers 102 of the repeater system 100.

In this example, the repeater system 100 may also serve as a router or hub, as discussed more later. The repeater system 100 includes one or more switches 103 providing interconnections between the transceivers 102, interconnections of the transceivers 102 to additional transceivers 104, and interconnections between the transceivers 104, on a selective basis. In this manner, the node 1 can transmit and receive information via the transceivers 102, 104 for any of the users at locations B, C and D. The switch(es) may also provide a connection to an external network 98 the same as or similar to the network 99, to offer additional communications for the node 1 and/or the user terminals.

The user stations include receiving terminal transceivers 7 for two-way optical communication. Preferably, the optical elements of the terminals receive and transmit multiple beams, for example, using the components shown in FIGS. 3 and 4 or as shown in FIG. 5. The terminal equipment 7 provides two-way data communication for user equipment. The user equipment 105 is shown as a simple data terminal, only for purposes of illustration. Those skilled in the art will recognize that the end-user devices will typically involve systems requiring relatively high-speed data communications. For example, the equipment 105B may be a group of computers or workstations interconnected and connected to the transceiver 7 at that location via a local area network. The equipment 105C may be one or more computer servers or host computers for high-volume data services, such as video distribution.

FIG. 6 also illustrates several further advantages of the repeater system, particularly when implemented with an internal switch or routing network. In the example, the direct line of site between network node 1 (A) and user station 7 at location B is blocked by a building or other obstacle 106. The node 1, however, has direct line of site communication with the transceivers 102, 104 of the repeater system 100. One or more of the repeater system transceivers 104, in turn have direct line of site to the transceiver module 7 of the user station B. The repeater system 100 therefore enables communication between A and B, in spite of the obstacle 106.

The direct line of site between A and C may be blocked by the building housing the repeater system 100, or the distance between A and C may be too great for the desired high-capacity data communication between those two transceivers. The repeater system 100 enables communication between A and C, in essentially the same manner as the example of communication between A and B. In these examples, to provide the desired high-level of data capacity from the node A to the terminal station B or C, the various transceivers utilize multiple beam transmissions, as discussed above relative to FIG. 1.

The invention, however, may also be used to provide repeater services on substantially the same side of the repeater 100 and with one or more beams between the repeater system and the terminal 7. In the picture, the station D is substantially on the same side of the repeater system 100 as the network node A. The direct line of site between network node 1 (A) and user station 7 at location D is blocked by a building or other obstacle 107. The node 1, however, has direct line of site communication with two or more of the transceivers 102, 104 of the repeater system 100. At least one of the repeater system transceivers 104, in this case a transceiver on the same side of the building housing the repeater system 100, has direct line of site to the transceiver module 7 of station D. The repeater system 100 therefore enables communication between A and B, in spite of the obstacle 107. In the example, because the equipment 105D requires a lower volume of data, the repeater transmits the data to and from the transceiver 7 only over beams from the one transceiver 104, without spatial division multiplexing.

In the examples, the transceivers of the repeater system appear on opposite sides of the system. Those skilled in the art will recognize that the precise physical arrangement of the various transceivers 104 on a given one or more buildings will vary depending on the communication needs and the physical geography of a particular installation.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A free-space optical communication system, comprising:
   a plurality of optical transmitting terminals;
   a plurality of optical receiving terminals for receiving information from the optical transmitting terminals;
   each optical transmitting terminal comprising a plurality of emitters and at least one lens, for forming a plurality of separate free-space information-carrying optical beams carrying different information streams;

each of the optical receiving terminals comprising at least one lens and a plurality of optical detectors for receiving spatially separated beams carrying different information streams at different angles and distinguishing the spatially separated beams in a non-overlapping fashion for further processing of information stream content; and an optical repeater system installed between the optical transmitting terminals and the optical receiving terminals and providing transportation of information streams between any transmitting terminal and any receiving terminal via at least two free-space routes thereby increasing overall transmission capacity, the optical repeater system comprising:

(a) a plurality of spatially separated multi-beam free-space optical receiver modules, each receiver module comprising a plurality of separate optical receivers for receiving information-carrying optical beams from different optical transmitting terminals, and an objective lens for directing information-carrying optical beams received at different angles from different optical transmitting terminals to the separate optical receivers;

wherein the receiver modules are placed sufficiently far from each other to prevent optical radiation of spatially separated free-space beams from different emitters of the transmitting terminals from creating cross-talk between information streams at the receiver modules' optical receivers;

(b) a plurality of spatially separated multi-beam optical transmitter modules, each comprising a plurality of optical beam transmitters for transmitting spatially separated beams to a plurality of the receiving terminals, and (c) a communication channel between each optical receiver of the receiver modules and any one of the transmitters of the transmitter modules, wherein:

each receiving terminal receives a free-space beam carrying one of the different information streams from each of at least two of the transmitter modules of the optical repeater system at different angles, and the transmitter modules of the optical repeater system are placed sufficiently far from each other to enable the receiving terminals to distinguish beams received at different angles from different transmitter modules.

2. A free-space optical communication system, comprising:

a plurality of free-space optical communication nodes for sending and receiving information signals, each free-space optical communication node comprising a first free-space multi-beam optical transceiver system;

a free-space optical repeater system comprising a plurality of second free-space multi-beam optical transceiver systems, and a network of communication links interconnecting the second optical transceiver systems;

each respective one of the first and second free-space multi-beam optical transceiver systems comprising:

(a) a plurality of beam emitters for emitting beams modulated with different streams of information;

(b) a plurality of beam receivers for receiving and detecting beams modulated with different streams of information; and (c) at least one objective lens: for optically processing the emitted beams from the emitters for free-space transmission to beam receivers of at least two different multi-beam optical transceiver systems, and for optically processing the beams received from the emitters of at least two different multi-beam optical transceiver systems for delivery to the separate beam receivers of the one respective optical transceiver system, wherein:

the second optical transceiver systems are spatially separated from each other to enable spatially separate transmission of at least two free-space beams to and from one or more of the communication nodes, and the at least one objective lens and the beam receivers of each of the first and second free-space optical transceiver systems are arranged for distinguishing free-space beams received at different angles for separate recovery of information streams received from different second and first free-space multi-beam optical transceiver systems, respectively.

3. A free-space optical communication system as in claim 2, wherein the repeater system comprises at least one switch for selectively reconfiguring the network of communication links interconnecting the second optical transceiver systems.

4. A free-space optical communication system as in claim 3, wherein:

the at least one switch also connects to an external link, for providing two-way communications to and from the free-space optical communication system via an external network; and at least one of the communication nodes provides two-way communications to end-user equipment.

5. A free-space optical communication system as in claim 2, wherein:

at least one of the communication nodes comprises a network connection node, for providing two-way communications to and from the free-space optical communication system via an external network; and at least one other communication node provides two-way communications to end-user equipment.

6. A free-space optical repeater system, for delivery of at least two information-carrying optical beams to and from any one of a plurality of free-space optical communication nodes, the repeater system comprising:

a plurality of free-space multi-beam optical transceiver systems arranged at distances from each other, each free-space multi-beam optical transceiver system comprising:

(a) a plurality of beam emitters for emitting beams modulated with different streams of information;

(b) a plurality of beam receivers for receiving and detecting beams modulated with different streams of information; and (c) at least one objective lens for optically processing the beams emitted from different emitters for transmission to different optical communication nodes and for optically processing free-space beams received from different optical communication nodes at different angles for separate delivery to the beam receivers and separate recovery of information streams carried by different beams; and a reconfigurable network of communication links interconnecting the optical transceiver systems; wherein:

the optical transceiver systems are sufficiently separated from each other to enable spatially separate transmission and receiving of at least two free-space beams to and from one or more of the optical communication nodes.

* * * * *